Patented July 18, 1950

2,515,790

UNITED STATES PATENT OFFICE 2,515,790

CERAMIC DIELECTRIC MATERIAL AND METHOD OF MAKING

Louis Navias, Schenectady, N. Y., assignor to General Electric Company, a corporation of New York No Drawing. Application April 22, 1949, Serial No. 89,151

9 Claims. (Cl. 25—157)

1

This invention relates to ceramic dielectrics. More particularly, it relates to a ceramic dielectric formed from barium titanate and a fluoride of the group consisting of alkaline earth fluorides and lead fluoride, and to the process of manufacturing such ceramic dielectric material.

Ceramic dielectrics possessing high dielectric constant, suitably low power factor, high breakdown strength and favorable resistance properties are in demand for radio apparatus and other uses which require such favorable combinations of electrical characteristics. Among such applications are filter capacitors for the high voltage supply to television viewing tubes. In a typical case a capacitor for this use must have a capacity of several hundred micromicrofarads and withstand 10 kilovolts D.-C. at an ambient temperature of 65° C.

In the process of developing capacitors for such use, various methods of firing have been employed. According to one process the formed raw materials are placed on zirconia setting sand and fired, but the fired product exhibits low resistivity values. In addition the resistivity values are non-reproducible from one sample to another prepared in exactly the same manner and from the same lots of raw ingredients. These erratic values of resistivity persist even though the dielectric constant, power factor and breakdown voltage values are favorable and persistent in nature from unit to unit.

It is an object of this invention to provide a ceramic dielectric material of superior resistivity.

It is a further object of the present invention to provide a ceramic dielectric material and method of manufacture wherein reproducible and favorably high resistivities are attainable. Other objects will become apparent from a consideration of the following description.

It has been found that ceramic dielectrics of consistently reproducible and superior resistivity may be prepared by completely surrounding the material during firing with a neutral or non-reacting layer or body of zirconium dioxide sand or powder.

One prior method of firing ceramic dielectric materials has been to place the materials in a furnace on zirconia setting sand supported on a refractory plaque. This firing process produces materials having low dielectric constant, high power factor and low resistivity which detracts from their applicability to various uses. If the formed raw materials are placed in a covered refractory sagger on a layer of zirconia sand while firing, the dielectric constant is raised and the

2 power factor lowered. While the volume resistivity is raised somewhat, it is still not high enough and, like the other prior art method values, it is not acceptably constant and reproducible from sample to sample.

It has now been found that if the formed raw materials such as, for example, a barium titanate-strontium fluoride mixture are completely embedded in or surrounded by granulated zirconia, the volume resistivity increases sharply, and, most surprisingly, the higher resistivity values are reproducible without special precautions in sample after sample. Not only are high and constant volume resistivity values obtained by the above procedure, but the dielectric constant is raised, the power factor lowered in general and the breakdown strength raised somewhat, such trends in the values of the various factors complementing the favorable resistivity characteristic. Thus the advantages of the present procedure are attained without sacrifice of other desirable qualities.

While the exact mechanism by which completely embedding the formed or shaped barium titanate-fluoride firing mixture in zirconia sand produces such good results is not known, it is believed that the fluoride compound in this way during dissociation and gasification tends to maintain a beneficial atmosphere around the body being fired. It is known that the fluoride acts as a flux in producing a compact fired material and also that little or no fluoride is present in the finished article.

While the present invention is described with relation to the use of strontium fluoride in conjunction with the barium titanate, any fluoride of the alkaline earth group, including calcium, barium, strontium and magnesium, is suitable, as well as lead fluoride. Likewise, the fluoride may be added in any amount desired up to about 10%; amounts over this limit do not add to the desirable qualities achieved with smaller amounts.

The usual fabricating and firing techniques are used in the manufacture of the improved dielectric material of the present invention except, of course, that the raw pressed material is completely embedded in or surrounded by zirconia sand during firing. The following will serve as an example of the process.

A mixture of 95% barium titanate and 5% strontium fluoride by weight is blended or mixed with water to produce a rather thick slurry which permits sufficient movement of the slip volume under the impulse of the mixing blades of, for example, a colloid mill and yet holds the particles of the mixture in suspension. Alternatively a ball mill may be used for mixing. After thorough blending, the mix is dehydrated as by filtering, dried and reduced to a powder by breaking through a mesh screen. The dielectric body or unit is formed into the desired shape by dry pressing using properly shaped dies under a pressure of two to three tons per square inch or more. Binders and body lubricants such as a paraffin and water emulsion, a solution of paraffin in carbon tetrachloride or a polyvinyl alcohol-water solution, among others, may be used if desired. Precaution should be taken that the binder is completely burned out before the peak firing temperature is reached.

The compacted raw dielectric elements or units are placed in a cool furnace and completely embedded in and surrounded by electrically fused zirconia sand. A layer at least one-half inch thick on all sides of the elements has been found very suitable, greater thicknesses neither adding to nor detracting from the results. The dielectric and embedding materials are preferably placed on refractory plaques or saggers. The rate of temperature increase for firing is varied from 200° C. to 300° C. per hour up to the peak temperature of about 1350° C. which is maintained for about three hours. The elements are allowed to cool in the furnace nearly to room temperature before removal.

The fired material, which is typically in the form of discs, may be made into capacitor elements in the usual way. Thus a silver paste or paint may be applied to each face of the disc, given the proper heat treatment to obtain a bonded metal surface and leads such as rivets soldered thereto. The unit may, if desired, then be encased in insulating material.

A number of discs approximately 0.3 inch thick and one inch in diameter containing 95% barium titanate and 5% strontium fluoride were fired for 3 hours at 1350° C. by the prior art and present methods and tested with the following results, the D.-C. voltage being applied for ten minutes to attain equilibrium conditions and the volume resistivity then being measured at 65° C. The dielectric constant and power factor were measured at room temperature.

| Placing of Disks | Dielectric Constant at 1000 Cycles | Power Factor at 1000 Cycles | D.-C. Breakdown in Oil, volts/mil | D.-C. Volume Resistivity at 65° C. | |
|---|---|---|---|---|---|
| | | | | Kv. for 10 Minutes | Resistivity, Ohm-cm.×10$^{12}$ |
| On layer of ZrO$_2$ sand on refractory plaque | 2,315 | 0.1262 | 58.9 | 2.6 | 0.024 |
| | 2,395 | 0.1230 | 52.1 | 2.6 | 0.047 |
| | 2,360 | 0.1550 | 54.9 | 3.1 | 0.010 |
| On layer of ZrO$_2$ sand contained in a covered refractory sagger | 3,800 | 0.0259 | 48.5 | 2.6 | 0.208 |
| | 3,890 | 0.0189 | 56.2 | 5.1 | 1.56 |
| | 3,860 | 0.0230 | 45.0 | 3.1 | 0.196 |
| Embedded in ZrO$_2$ sand in a refractory sagger | 4,000 | 0.0214 | 68.5 | 7.2 | 4.58 |
| | 3,955 | 0.0208 | 43.7 | 7.2 | 6.40 |
| | 4,110 | 0.0217 | 45.1 | 7.2 | 6.70 |
| | 3,980 | 0.0224 | 55.4 | 7.2 | 7.25 |
| | 4,270 | 0.0207 | 47.5 | 7.2 | 5.66 |
| | 4,000 | 0.0212 | 66.5 | 7.2 | 4.35 |

The capacitance of all of the above elements was about 350 micromicrofarads under the test conditions.

Dielectric elements prepared according to the present invention are long-lived, six units having been held at 15 kv. D.-C. at room temperature for 200 hours and then at 65° C. at 15 kv. D.-C. for another 200 hours without signs of failure. Another group of four units was subjected to 18 kv. D.-C. at room temperature for 250 hours with no indication of breakdown.

What I claim as new and desire to secure by Letters Patent of the United States is:

1. In the manufacture of ceramic dielectric elements from barium titanate and a fluoride of the group consisting of alkaline earth fluorides and lead fluoride, the process which includes blending the raw materials with water, dehyrating and powdering the mixture, forming the powdered material into the desired shape under a pressure of not less than two tons per square inch, completely embedding the formed material in powdered zirconia and firing it at an elevated temperature up to 1350° C.

2. In the manufacture of ceramic dielectric elements containing not less than 90% by weight barium titanate and not more than 10% by weight of a fluoride of the group consisting of alkaline earth fluorides and lead fluoride, the process which comprises mixing the barium titanate and the fluoride with water, dehydrating and reducing the mixture to a powder, forming the powder into the desired shape under a pressure of at least two tons per square inch, completely embedding the shaped material in zirconium dioxide sand and firing at 1350° C. for about three hours.

3. In the manufacture of ceramic dielectric elements from barium titanate and a fluoride of the group consisting of alkaline earth fluorides and lead fluoride, the process which comprises mixing the raw materials with water, dehydrating the mixture and reducing to a powder, forming the powdered material under pressure into the desired shape, surrounding the formed material with zirconium dioxide sand, and firing at a temperature of about 1350° C. for about three hours and cooling to room temperature.

4. In the manufacture of ceramic dielectric units from not less than 90% by weight barium titanate and not more than 10% by weight strontium fluoride, the process which comprises mixing the barium titanate and strontium fluoride with water, dehydrating and reducing the mixture to a powder, forming the powder into the desired shape under a pressure of at least two tons per square inch, completely surrounding the shaped material with zirconium oxide sand and firing at 1350° C. for about three hours.

5. In the manufacture of ceramic dielectric elements from 95% by weight barium titanate and 5% by weight strontium fluoride, the process which includes mixing the barium titanate and strontium fluoride with water to form a blend, dehydrating and powdering the blend, forming the powdered material into the desired shape under a pressure of not less than two tons per square inch, completely embedding the formed material in powdered zirconia and firing for about three hours at 1350° C.

6. In the manufacture of ceramic dielectric units from barium titanate and a fluoride of the group consisting of alkaline earth fluorides and lead fluoride, the improvement which comprises firing up to a temperature of 1350° C. the units while embedded in zirconium dioxide sand.

7. The process of making ceramic dielectric elements of barium titanate and a fluoride of the group consisting of alkaline earth fluorides and lead fluoride which includes firing up to a temperature of 1350° C. the elements while completely surrounded by zirconium dioxide.

8. In the manufacture of ceramic dielectric elements from barium titanate and strontium fluoride, the step which comprises firing up to a temperature of 1350° C. the formed raw materials while embedded in zirconium dioxide sand.

9. The ceramic dielectric unit made by the process of claim 1, said product having a higher volume resistivity, a higher dielectric constant, a lower power factor, and a higher breakdown strength than the corresponding product which has been fired in the open air.

LOUIS NAVIAS.

REFERENCES CITED

The following references are of record in the file of this patent:

UNITED STATES PATENTS

| Number | Name | Date |
|---|---|---|
| 868,106 | Mayer | Oct. 15, 1907 |
| 1,485,132 | Styffe | Feb. 26, 1924 |
| 1,739,151 | Johnson | Dec. 10, 1929 |
| 2,214,703 | Thurnauer | Sept. 10, 1940 |
| 2,335,325 | Wainer | Nov. 30, 1943 |